United States Patent [19]

Hall

[11] 4,067,010
[45] Jan. 3, 1978

[54] CIRCUIT FOR INHIBITION OF AUTOGENETIC FALSE ALARMS IN A COLLISION AVOIDANCE SYSTEM

[75] Inventor: James Robert Hall, Canoga Park, Calif.

[73] Assignee: RCA Corporation, New York, N.Y.

[21] Appl. No.: 643,328

[22] Filed: Dec. 22, 1975

[30] Foreign Application Priority Data

Apr. 14, 1975 United Kingdom ............... 15217/75

[51] Int. Cl.² .............................................. G01S 9/56
[52] U.S. Cl. ............................................. 343/6.8 LC
[58] Field of Search ..................... 343/6.8 R, 6.8 LC

[56] References Cited

U.S. PATENT DOCUMENTS

| | | | |
|---|---|---|---|
| 2,427,523 | 9/1947 | Dolberg et al. ................. | 343/17.1 R |
| 2,943,318 | 6/1960 | Deloraine et al. ............ | 343/68 R X |
| 3,076,190 | 1/1963 | Shames et al. ............. | 343/6.8 LC X |
| 3,508,260 | 4/1970 | Stein .......................... | 343/6.8 LC X |
| 3,716,857 | 2/1973 | LeGrand ....................... | 343/6.8 LC |
| 3,788,647 | 1/1974 | Evans ........................ | 343/6.8 R X |
| 3,803,607 | 4/1974 | Robinson .................. | 343/6.8 LC X |
| 3,872,476 | 3/1975 | Shames et al. ............. | 343/6.8 LC X |
| 3,887,916 | 6/1975 | Goyer ............................ | 343/6.5 LC |

*Primary Examiner*—Malcolm F. Hubler
*Attorney, Agent, or Firm*—Edward J. Norton; H. Christoffersen; Joseph D. Lazar

[57] ABSTRACT

In a cooperative collision avoidance system, probe signals are inhibited for a predetermined time period to prevent autogenetic false alarms, that is, false replies to one's own interrogation probes.

3 Claims, 2 Drawing Figures

CIRCUIT FOR INHIBITION OF AUTOGENETIC FALSE ALARMS IN A COLLISION AVOIDANCE SYSTEM

CROSS REFERENCE TO RELATED APPLICATIONS

Of interest are the following copending patent applications: Ser. No. 569,995, filed Apr. 21, 1975, entitled "Full Range Correlator for Use in a Collision Avoidance System," now U.S. Pat. No. 4,003,050, and Ser. No. 643,481 filed on Dec. 22, 1975 entitled "Multi-Target Tracker," both the inventions of J. H. Miller; Ser. No. 462,491, filed Apr. 19, 1974, by J. J. Lyon, entitled "Altitude Coding for Collision Avoidance Systems," now U.S. Pat. No. 3,947,845, and Ser. No. 643,478 filed Dec. 22, 1975 entitled "Multi-Target Tracker Tracking Near Co-Range Targets" based on the invention of W. L. Ross, all applications having been assigned to the same assignee as the assignee of the present patent application.

BACKGROUND OF THE INVENTION

1. Field of the Invention

This invention relates to an interrogation probe circuit in a vehicular collision avoidance system, more particularly, of the SECANT type.

2. Description of the Prior Art

Collision avoidance systems have been proposed as means of preventing collisions by vehicles both of the maritime vehicle type and of the airborne type. Cooperative systems of the asynchronous type include interrogator-transponder techniques in which interrogation signals or probes are transmitted from one vehicle on a random basis. Vehicles in the vicinity receiving such probes respond with signals of various indicia to provide to the interrogation vehicle information relating to both range and information identifying the vehicle and its position. In airborne systems such information may include the relative or actual altitude of the aircraft.

An existing collision avoidance system known by the acronym SECANT (Separation Control of Aircraft by NonSynchronous Techniques) employs probes identified by any one of a plurality of frequencies and replies using different frequencies of the same band but arranged into a predetermined correspondence to a particular probe frequency. Special correlation techniques separate the true reply received by any one vehicle from received reply signals induced by probes from remote vehicles, the latter replies being generally identified as "fruit." Such a system is described in U.S. Pat. Nos. 3,755,811 issued Aug. 28, 1973, and 3,803,608 issued Apr. 9, 1974, based on the inventions of Jack Breckman, as well as U.S. Pat. No. 3,803,604 describing a "Digital Tracker," issued Apr. 9, 1974, to Bernard Case. A correlator for such a system is described in U.S. Pat. No. 3,887,916 issued to R. B. Goyer on June 3, 1975.

In such systems singular or multi-path reflections of the probe signals either from the surface of the vehicle itself or from reflections from the terrain can be received by the prober's antenna system and cause false alarms. Such false alarms can disrupt the orderly processing of the correlator and tracker thereby masking or dominating the true replies with the false replies that are, indeed, worse then the typical "fruit" replies from other vehicles. Such autogenetic false alarm signals can cause a vehicle to track itself and disrupt the orderly operation of the system.

SUMMARY OF THE INVENTION

According to the present invention a vehicular collision avoidance system is provided with inhibit logic functioning for a predetermined period of time to prevent replies to probe signals from being transmitted until a certain margin of time has elapsed whereby false probes due to reflections as distinguished from true target probes are eliminated.

DESCRIPTION OF A PREFERRED EMBODIMENT

Figure 1:
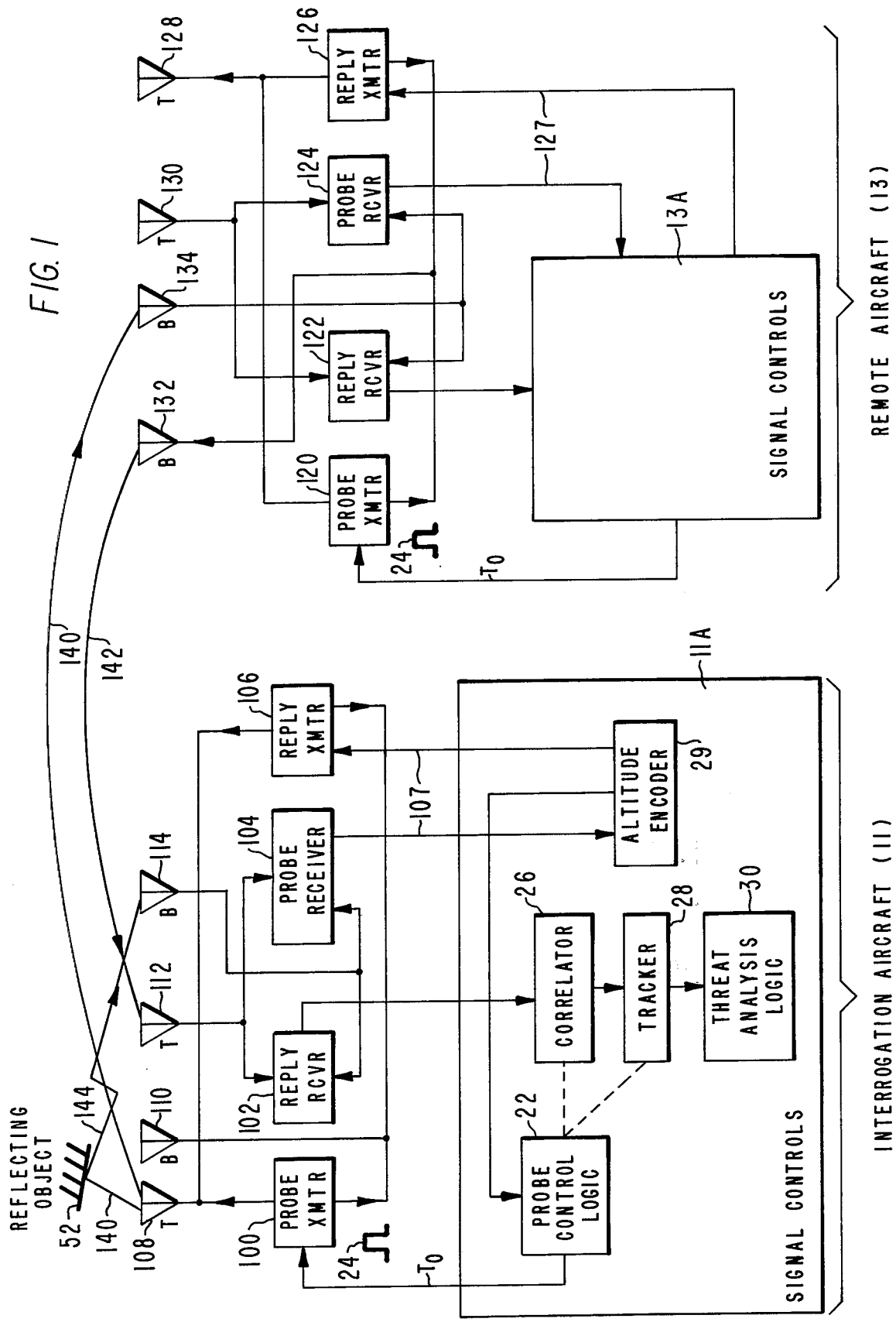
FIG. 1 is a simplified block diagram of a typical collision avoidance system suitable for use in the present invention.

A typical collision avoidance system preferably of the SECANT type is illustrated in the functional block diagram of FIG. 1. Such a system is described in one or more of the above patents and is simplified for the purpose of understanding the problem of concern to the present invention.

Such a system consists of an interrogation vehicle such as an aircraft 11 provided with a probe transmitter 100, a reply receiver 102, a probe receiver 104 and a reply transmitter 106. The transmitters 100 and 106 are coupled to top antenna 108 and bottom antenna 110. The receivers 102 and 104 are coupled to top antenna 112 and bottom antenna 114. The antennae can be integrated in a functioning system so that a single antenna located on the top of the aircraft, to transmit and receive signals in the hemisphere above the aircraft, and a single antenna on the bottom of the aircraft to transmit and receive signals in the hemisphere below the aircraft, can serve both transmitters and receivers. Suitable controls are provided in the system to assure that transmission signals do not damage the receivers and receiving functions are not inhibited by the transmitting functions. As a consequence, certain delays occur between the time that a control signal is generated and the time of actual transmission of a signal from the antennae. Also there are delays between the time of receipt of a signal by the antenna and the time the consequent signal is generated in the system. Such delays are considered inherent and are considered the base or reference upon which the present invention is used. Such controls do not form part of this invention and need not accordingly be described further being well known in this art.

A remote aircraft 13 is similarly equipped with a corresponding probe transmitter 120, reply receiver 122, probe receiver 124 and reply transmitter 126 coupled to top antennae 128 and 130 as well as bottom antennae 132 and 134.

Each aircraft in the system is equipped with signal controls shown in certain detail in block 11A for aircraft 11. Similar controls are provided for aircraft 13 as indicated by block 13A. In particular, the controls comprise probe control logic 22 of the form described in the above-identified Goyer U.S. Pat. No. 3,887,916 and copending application Ser. No. 569,995, now U.S. Pat. No. 4,003,050, which functions to control the probe signals 24 of different frequencies in accordance with the signalling format and pattern for transmission to the environment by probe transmitter 100 over antennae 108 and 110. Probe logic 22 cooperates with a correlator 26 and a tracker 28 which, in turn, includes suitable threat analysis logic 30. A typical and suitable correlator may take the form of either of the above-identified Goyer patent and copending patent application Ser. No. 569,995. Tracker 28 may be of the form that is described in the above-identified Digital Tracker patent of Bernard Case, or the copending applications of J. E. Miller and W. L. Ross.

Means for providing altitude information of the reply aircraft (13) to the interrogator aircraft (11) is provided with an altitude encoder 29 cooperating with probe logic 22, receiver 104 and transmitter 106. Such an encoder is described in copending application, Ser. No. 462,491, now U.S. Pat. No. 3,947,845, supra.

In typical and normal operation, a randomly timed pulse 24 from probe control logic 22 causes a signal (140) to be radiated from top antenna 108 of aircraft 11 to all other vehicles in the vicinity, such as aircraft 13. Probe receiver 124 in a possible threat aircraft 13 upon receipt of such a probe signal 140 causes a reply signal 142 to be transmitted by reply transmitter 126 in typical transponder action from its bottom antenna 132. Reply receiver 102 on interrogator vehicle 11, passes the returned reply signal to correlator 26 which separates that reply from signals intended for other aircraft and thence to tracker 28 to determine the range, range rate, and time (tau) to potential collision with such a remote vehicle. The output of tracker 28 in turn is passed to threat analysis logic 30 where the range, tau and relative altitude position are examined against the stored threat criteria and the necessary collision avoidance commands are generated and displayed to the pilot.

It should be appreciated that the exchange of probe and reply signals discussed above between an interrogation aircraft 11 and remote aircraft 13 of occurring during the same time periods among a plurality fo such aircraft having varying degrees of range between each other. Thus, interrogation aircraft 11 is functioning as a remote aircraft to other aircraft including aircraft 13. An essential system constraint, subject to certain conditions that will be explained, requires that each aircraft receiving a probe signal, as by receiver 104 (aircraft 11) or receiver 124 (aircraft 13), reply immediately to that probe with an appropriately frequency coded reply pulse signal via link 107 to transmitter 106 and link 127 to transmitter 126.

Since each aircraft vehicle has an internal probe receiver and reply transmitter such as receiver 104 and transmitter 106 of its own, it is necessary to inhibit the effects of the direct probe signal 140 from the probe system from activating the internal reply system via antenna 114 and receivers 102 and 104 of the interrogating aircraft. According to prior art techniques, a simple blanking technique may be employed in the receivers to effect such an inhibiting control since there is a finite turn around delay in the transponder and no error in zero or near zero range detection is introduced.

Nevertheless, a problem can develop when the probe signal is reflected from a distant point such as the earth's surface or, in general, from a reflecting surface 52 causing the radiated probe signal 140 to be reflected as signal 144 to be received an antenna 114. Of course, ground reflected signals can be caused by probes from a bottom antenna 110 and received via top antenna 112 or, vice versa. Such a reflection can result in a delay equivalent to the apparent range of a potential threatening aircraft.

If the reflection path is closing, as occurs, for example, in a descending flight path on approaching the source of ground reflection, a second threat criteria is met. An aircraft replying to itself will always appear to be at co-altitude which meets one of the other criteria causing thereby a maneuver command, possibly fatal, to be generated. Such an autogenetic signal (144) is a false alarm. The present invention is addressed to a means to avoid that problem.

To avoid such highly undesirable operating conditions causing false alarms, the signal 140 that is transmitted as a probe signal must be identified as being either a self-generated (autogenetic) probe and eliminated before it becomes a reply. Since all correlated replies are synchronous with the probe time base as explained in more detail in the above-identified patents and copending applications, even in a random transponding system, the replies must be sorted by coded identification indicia transmitted on the range signal. Such an identification indicia requires additional implementation and time to exchange identity.

Figure 2:
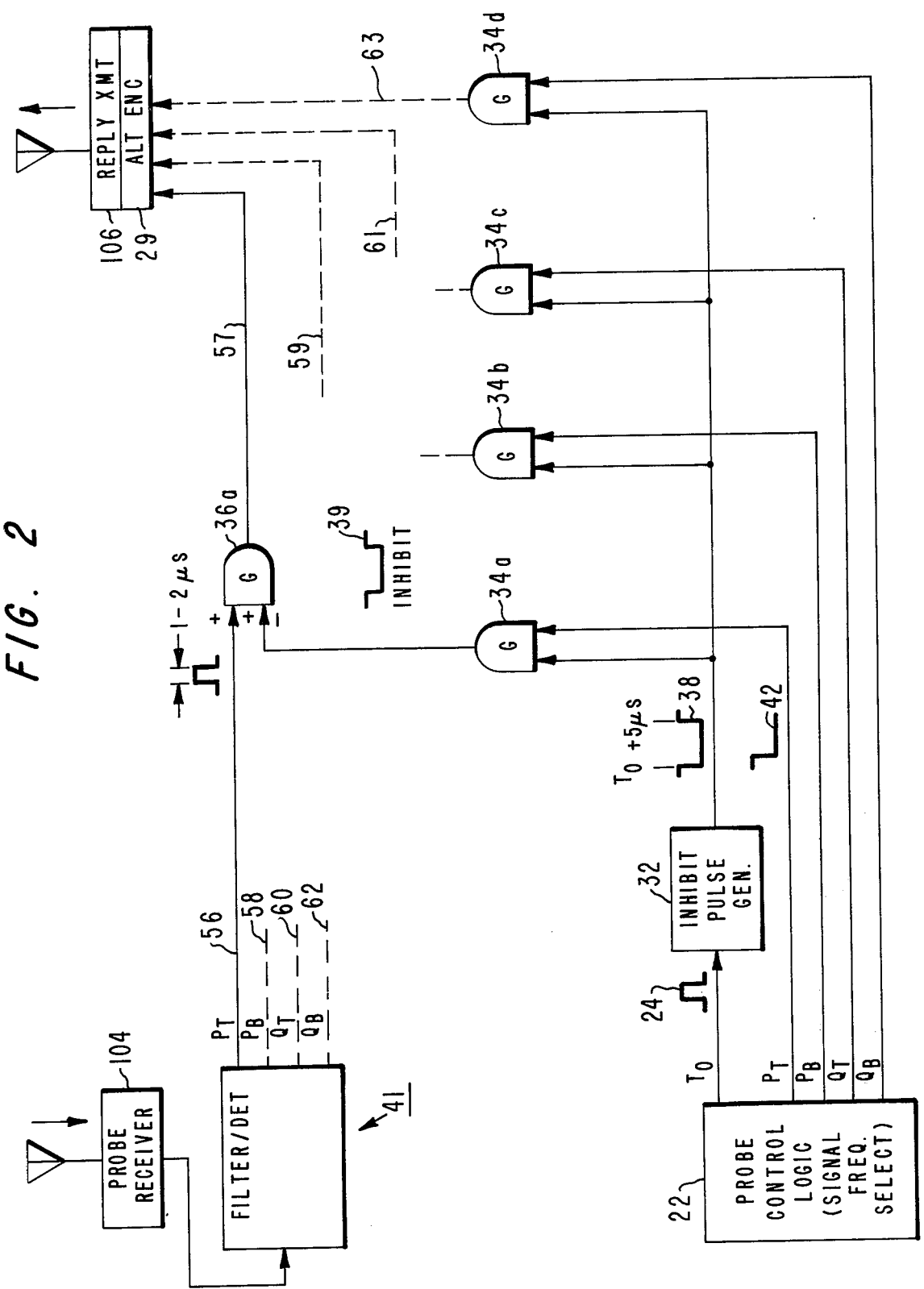
FIG. 2 is a system and logic diagram of the present invention.

According to the present invention, an inhibitor circuit is provided in the transponder loop to prevent generation of a reply to the internally generated probe. The arrangement of such an inhibitor circuit is illustrated in FIG. 2.

The following criteria are used as a sorting basis in the output of a probe receiver 104 of the interrogator vehicle 11, for example. It should be noted that each vehicle (11, 13, etc.) provided with the transmitting and receiving equipment would have its probe receiver (104, 124, etc.) and reply transmitter (106, 126, etc.) equipped with such an inhibitor circuit. It is noted further that the inhibiting circuit is functioning during only the initial portion of a probe cycle to prevent the false alarm signals as described above.

The following criteria are basic to the operation of the receiver (104) of the probing (interrogating) vehicle. First, the internally generated probes (24) are synchronous with the internal time base of the vehicle. Second, when the system is of the multifrequency type, such as SECANT, the frequency pattern of the local probe is known. Third, the actual probes that are transmitted from the vehicle (probe signal 140) are non-synchronous with respect to all other probes from other vehicles in the system, indeed, in the vicinity of the probing vehicle. Fourth, the true probe frequency patterns do not match the local random pattern. Fifth, the useful signal reflected path time segment is a small percentage of the system interrogation time base. These criteria will become better understood when considered with the embodiment of the invention illustrated in FIG. 2.

With respect to the frequency assignment pattern used in one type of SECANT, a different frequency is assigned for each of several probe signals and possible reply signals. Thus, a P and Q SECANT type signal is used as a probe designation further refined as to whether it is a probe transmitted from a top (T) antenna (108, 128, etc.) or a bottom (B) antenna (110, 132, etc.) by the symbols: $P_T$, $Q_T$, $P_B$, $Q_B$, each one being assigned a unique frequency. Two possible replies to each of such probes is utilized to encode the reply with information data represented by binary logic, each bit distinguished by a unique frequency for each. Thus, for four probes and eight replies there are 12 different signals, each of a different and unique frequency typically spaced in 1 MHz interval. The present invention is concerned in particular with the four probe signals $P_T$, $Q_T$, $P_B$ and $Q_B$.

Each of the probe receivers (104, 124, etc.) and reply transmitters (106, 126, etc.) are modified in accordance with the present invention by the addition of a single inhibit pulse generator 32 and a plurality of AND gates 34a, 34b, 34c, 34d, each coupled respectively to a respective one of a plurality of receiver-transmitter links 56-57, 58-59, 60-61, 62-63, each link including an associated AND gate 36a, 36b, etc, only the gate for link 56-57 being shown. Note that links are indicated generally by reference numbers 107 and 127 in FIG. 1, including the altitude encoder 29.

Each receiver-transmitter link includes suitable detector and filter circuits 41 that select the reply signal according to its frequency that is to be transmitted back to the remote probing vehicle (aircraft 13 in this example) in response to the incoming probe at a frequency different from the frequency of the incoming probe signal in accordance with the SECANT system mentioned above and described in more detail in the patents cited, supra. Typically, as just described, there is a different frequency assigned to each of the P and Q type replies for the top antenna and the bottom antenna. Each reply is assigned a different frequency manifesting a plus or minus value indicative of a signal corresponding to logic 1 or logic 0 for data transmission purposes for a reply signal, but not, it should be noted, for probe signal purposes. Thus, a total of eight different frequency reply signals are provided of which a unique one is transmitted from reply transmitter 106 in response to the particular probe signal received by its own probe receiver 104.

The inhibit pulse generator 32, common to all links in each aircraft, is suitably a one-shot pulse generator with a pulse width of 5 microseconds, responding to the reference signal 24 representing the local reference time zero of the vehicle. A longer pulse width may be used as needed. This signal corresponds to the main "bang" of conventional radar. In the SECANT system, it is termed the $T_0$ signal pulse noting that the particular frequency of the transmitted probe pulse is selected under control of a random selector means (not shown) according to the SECANT principles discussed above. Pulse generator 32 responds to the $T_0$ pulse 24 to develop an inverted pulse 38 which has a width of 5 microseconds. For the preferred embodiment being described, a five microsecond inhibit pulse 38 will inhibit the system from replying to all incoming probe signals whatever the source having the same frequency as the frequency of the probe signal 140 last transmitted by transmitter 100 (FIG. 1) within a range of 2,500 feet of the interrogating vehicle (11). This distance is based on the well known round trip delay of a radar signal propagated at the rate of 500 feet per microsecond. It will be appreciated that the width of pulse 38 may be adjusted to any desirable length in accordance with the system requirements. In a system using a plurality of frequencies for exchanging probe and reply data between the interrogating and reply vehicles, such a system being embodied by the SECANT system, a separate AND gate, such as AND gate 36a as shown, is provided for each reply control link 56-57, 58-59, 60-61, 62, 63 as described above. This is required so that only probes conforming or matching to the local (interrogating aircraft) probe pattern are inhibited. Thus, as for the SECANT system, probe receiver 104 is provided with a filter detector 41 having four filters each tuned to a respective one of four possible frequencies ($P_T$, $P_B$, $Q_T$, $Q_B$) that may be transmitted as a probe 140 from the probing vehicles. A probe signal from a remote aircraft that is received by receiver 104 will be processed through the corresponding filter and conducted over an associated link path 56, 58, 60, or 62, through its normally operative AND gate 36a, 36b, 36c, 36d (only 36a being shown) for causing a reply to be transmitted by the reply transmitter 106. According to the present invention, the normally operative AND gate 36a, 36b, etc., in each link is inhibited to prevent replies from being transmitted that would correspond to its probe frequency signal during the predetermined interval outlined above.

Thus, in operation, upon the generation of each probe pulse $T_0$, inhibit pulse generator 32 develops an inhibit pulse 38 which is applied simultaneously as one input to each of AND gates 34a, 34b, 34c, and 34d. An inhibiting signal 39 to any of gates 36a, 36b, etc. from its associates AND gate 34a, 34b, etc. is generated only by the coincidence of a probe signal 42 from the probe logic control 22 corresponding to the particular type of probe signal ($P_T$, $P_B$, $Q_T$, $Q_B$) that was transmitted at reference time $T_0$, in the example illustrated, probe signal $P_T$, throughout the probe period.

This ANDed gate signal 39 inhibits normally operative AND gates 36a-36d to prevent any signals received via the probe receiver 104 and control links 56, 58, 60, 62 from being passed to reply transmitter 106 via the associated link path 57, 59, 61, 63. The lack of coincidence of these signals, allows for the normal reply-transmit operation of receiver 104 and transmitter 106 over the control links normally not inhibited.

Consider a system based on 2,500 foot reply radius, as used in the SECANT system, wherein a nominal 1,000 microsecond clock period for generating the $T_0$ pulses is used. The pulse repetition time (PRT) effect on incoming signals, that is, the expected probes as well as fruit from remote vehicles, is calculated to be 0.125%. This value is based on a five microsecond inhibit interval during each 1,000 microsecond clock period during which all possible probe signals may be received via receiver 104. Further since only one of four possible probe frequencies are transmitted during such a period, the inhibition effect is reduced to the calculated value of 0.125%. Thus, about one tenth of one percent of all of the possible desired or true replies are inhibited by the circuit of FIG. 2. In effect, there is a complete inhibition of any local probe reflections which would cause the self-generated (autogenetic) false alarms. The normal blocking of desired probes by system transmissions of such probes is under conditions of high density traffic, typically two to five percent. The addition of 0.1 percent to 0.2 percent of inhibition to the replies to probes is negligible with respect to such normal blocking. Increasing the inhibit pulse 38 from five to 25 microseconds will increase the PRT effect from 0.125% to 0.625%, a value that is still negligible. It should be understood that each transponder station operates to transmit probe signals on a periodic and random basis but to reply without significant delay to any received probe signals. The effect of being non-responsive to the small percentage of probe signals seeking replies by the inhibiting circuit of this invention does not adversely affect the overall system accuracy to identify threatening targets. But to the contrary, the circuit may improve the accuracy of the system by not allowing for autogenetic false alarms.

It is noted that the altitude encoding logic 29 included in the links 107, 127, between the probe receivers 104, 124 and their respective corresponding reply transmitters 106, 126 is an optional discriminating means in a collision avoidance system such as SECANT, and as described in detail in the aforementioned copending application Ser. No. 462,491, now U.S. Pat. No. 3,947,845. The present invention is applicable to a collision avoidance system whether or not such altitude discriminant means are used.

It will thus be appreciated, that in accordance with the present invention, means are provided to eliminate substantially the false alarms that are effected in a vehicular collision avoidance system utilizing cooperative transponder systems and is particularly effective in systems utilizing multi-frequency signalling to provide signals of different frequencies for, what is termed, frequency discrimination.

What is claimed is:

1. A circuit in a probe-reply station of a collision avoidance system for inhibiting autogenetic false alarm signals generated by said station, comprising the combination of:

means for transmitting periodic probe signals including means for randomly selectively generating probe signals of different types and transmitting one probe signal of one of said types;

normally operative probe reply means for transmitting a reply signal in response to received probe signals; and means responsive to said probe signal transmitting means indicative of the transmission of a probe signal for inhibiting said normally operative probe reply means from transmitting a reply signal for a predetermined but relatively short period of time following the transmission of each of said transmitted probes;

wherein said probe reply means includes means for receiving said probe signals, and means responsive to received probe signals for generating a reply signal corresponding to each of said probe signal types; and wherein said inhibiting means includes means for inhibiting the transmission of said reply signals that correspond to said one probe signal type.

2. A circuit according to claim 1 wherein each of said probe signal types are distinguished from each other on the basis of frequency.

3. A circuit according to claim 1 wherein:

said probe reply means includes first gate means coupling received probe signals to transmitted reply signals, and said inhibiting means includes second gate means for inhibiting said first gate means.

* * * * *